United States Patent [19]

Bennett et al.

[11] 4,005,178

[45] Jan. 25, 1977

[54] METHOD FOR CONVERTING UF5 TO UF4 IN A MOLTEN FLUORIDE SALT

[75] Inventors: Melvin R. Bennett; Carlos E. Bamberger; A. Donald Kelmers, all of Oak Ridge, Tenn.

[73] Assignee: The United States of America as represented by the United States Energy Research and Development Administration, Washington, D.C.

[22] Filed: July 10, 1975

[21] Appl. No.: 594,823

[52] U.S. Cl. .............................. 423/259; 252/472; 252/474; 423/5; 423/11
[51] Int. Cl.² .................. C01G 43/06; B01J 23/42; B01J 23/52
[58] Field of Search .................. 423/5, 11, 259; 252/472, 474

[56] References Cited
UNITED STATES PATENTS

| | | | |
|---|---|---|---|
| 3,156,735 | 11/1964 | Armstrong | 252/474 X |
| 3,309,231 | 3/1967 | Hess | 252/474 X |
| 3,941,870 | 3/1976 | Ekstrom et al. | 252/472 X |

*Primary Examiner*—Richard E. Schafer
*Attorney, Agent, or Firm*—Dean E. Carlson; David S. Zachry; Allen H. Uzzell

[57] ABSTRACT

The reduction of $UF_5$ to $UF_4$ in a molten fluoride salt by sparging with hydrogen is catalyzed by metallic platinum. The reaction is also catalyzed by platinum alloyed with gold reaction equipment.

4 Claims, No Drawings

METHOD FOR CONVERTING UF5 TO UF4 IN A MOLTEN FLUORIDE SALT

BACKGROUND OF THE INVENTION

This invention was made in the course of, or under, a contract with the Energy Research and Development Administration. The subject relates to fuel preparation for molten salt breeder reactors, and more particularly to the reconstitution of spent molten fuel salt after fission product removal.

In a Molten salt Breeder Reactor, fissionable material is present in the form of a molten fuel salt which continuously flows in a primary circuit through the reactor core to a heat exchanger and back to the core. The fuel salt is a composition of mutually soluble metal fluorides selected for their nuclear and physical properties. Of particular interest is a fuel salt consisting of a carrier salt of $LiF-BeF_2-ThF_4$ (72—16—12 mole %) and $UF_4$ present in amounts of 1—4% by weight.

During the course of reactor operation, fission products including rare earths and bred-in protactinium build up in the fuel salt and adversely affect the nuclear properties of the fuel. In order to more efficiently operate the reactor, the level of neutron poison fission products must be kept at a minimum. This is accomplished by continuously removing spent fuel from the primary circuit, processing it to remove fission products, and returning the reprocessed molten salt to the primary circuit. It is desirable for safety and economy that the fuel processing plant be a component of the reactor itself and that the salt be kept in the molten state throughout the processing system.

While fused molten salts are often spoken of as mixtures of several metal salts, they are actually a special class of liquid composed entirely of positively and negatively charged ions. Some molten fluorides are known to present material compatability problems. $UF_5$ is so corrosive that fluoride fuel salts containing the U(V) ion must be handled with gold equipment.

Pa and rare earth fission products can be readily removed from the molten salt stream by contacting the spent fuel salt with liquid bismuth containing a reductant (Li or Th). Since uranium is also taken up from the salt in this manner, it is more economical that the uranium component be removed by fluorination prior to rare earth removal and returned to the fuel salt. The fluorination step is accomplished by passing $F_2$ gas countercurrently through the molten salt in a fluorination zone to oxidize dissolved $UF_4$ in the fuel salt to gaseous $UF_6$, which exits the fluorination zone with unreacted $F_2$.

The most efficient way to reconstitute the fuel salt is to return the uranium to the fuel salt stream by passing the $UF_6$-$F_2$ gas stream directly from the fluorination zone through fuel salt containing dissolved $UF_4$. The $UF_6$—$F_2$ stream reacts with the $UF_4$ by the following reactions:

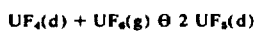

$$UF_4(d) + UF_6(g) \ominus 2\, UF_5(d) \qquad 1$$

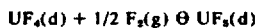

$$UF_4(d) + 1/2\, F_2(g) \ominus UF_5(d) \qquad 2$$

The salt which now contains $UF_5$ is then treated with hydrogen to reduce the $UF_5$ to $UF_4$ by the following reaction:

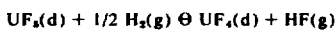

$$UF_5(d) + 1/2\, H_2(g) \ominus UF_4(d) + HF(g) \qquad 3$$

With respect to the reactions herein described, (d) refers to the dissolved phase and (g) refers to the gaseous phase.

Description of the Prior Art

In the prior art, reaction (3) proceeded very slowly and was very inefficient with respect to $H_2$ utilization. As reported by M. R. Bennett and L. M. Ferris in J. Inorg. Nuclear Chemistry 36, 1285-1290 (1974), the reduction by hydrogen was very slow in contrast to the almost instantaneous reaction of $UF_6$ with dissolved $UF_4$. For example, with a salt containing about 3 wt. % U(V) contacted with $H_2$ at 550° C, complete reduction to U(IV) was never achieved, even when hydrogen was admitted at a rate such that the stoichiometric amount was introduced every two minutes. Approximately 50% reduction was eventually achieved after eight hours. Because of this relative unreactivity, reaction (3) was the rate determining step for the entire fuel reconstitution process.

SUMMARY OF THE INVENTION

It is an object of the present invention to provide a method for reducing $UF_5$ dissolved in a molten salt which is much faster and more efficient with respect to hydrogen utilization than the prior art. This is accomplished by providing a method of reducing U(V) in a molten fluoride salt comprising reacting said salt with hydrogen in the present of metallic platinum.

It is a further object to provide a fast efficient method which may be carried out with a minimum of material handling. This is accomplished by conducting the reaction of hydrogen with $UF_5$ in the molten fuel salt in contact with gold equipment alloyed with platinum.

DETAILED DESCRIPTION

Extensive investigations into the cause of the low rate of reaction of gaseous $H_2$ with dissolved $UF_5$ in a molten salt have been conducted. Kinetic studies revealed that at 550° C the reaction exhibits zero order kinetics, being independent of both the U(V) concentration of the salt and the $H_2$ flow rate. When the reaction was conducted with various mixtures of $H_2$-Ar, zero order kinetics were again exhibited. At 675° C, the reaction of $UF_5$ and $H_2$ was seen to demonstrate first order kinetics indicating some change in reaction mechanism at the increased temperatures; however, the reaction rate was still low and hydrogen utilization was less than 1% in all cases. Based upon this and other data it was concluded that the rate limiting step in the reaction was the dissociation of molecular hydrogen.

It has been found according to the present invention that the reaction of $H_2$ with $UF_5$ in a molten fluoride salt media is effectively catalyzed by metallic platinum. While platinum is one of several well known contact catalysts for many reactions involving hydrogen, the discovery that platinum can function catalytically in a molten fluoride salt medium was surprising and unexpected. Molten fluoride salts in general are so highly reactive that the behavior of any metal, particularly a finely divided catalyst, is largely unpredictable.

In conventional platinum catalysis, e.g., in gaseous, aqueous, or covalent organic liquid media, the platinum catalyst functions as a site for $H_2$ absorption and dissociation, effectively increasing the local concentration of H atoms in the presence of other reactants. In order for platinum to function as a hydrogenation catalyst, it is essential that the platinum does not participate in side reactions. As pointed out earlier, $UF_5$ is so highly corrosive that nickel and copper equipment normally used in molten salt processing had to be replaced by gold. Since platinum is known to react with fluorine forming stable complexes, its catalytic behavior in the presence of molten fluoride salts, and particularly $UF_5$, was most remarkable.

To specifically illustrate the marked catalytic effect several experimental samples with simulated fuel salt are presented. The experimental runs were run under the following general conditions:

To simulate fuel from a MSBR primary circuit, a charge of a proposed fuel carrier salt $LiF—BeF_2—ThF_4$ (72–16–12 mole percent) plus 1 to 4 percent by weight of $UF_4$ is placed in a gold reactor in argon atmosphere, melted, and sparged through a gold sparge tube submerged in the melt above the surface of the reactor, with equimolar $H_2$—HF at 600° C for about 24 hours to remove any oxide contaminants. The stoichiometric amount of gaseous $UF_6$ is added to the melt at 600° C to convert all the uranium to $UF_5$ according to reaction (1). The temperature is then adjusted to the desired value and the molten fluoride comprising $UF_5$ is sparged with hydrogen by bubbling $H_2$ through the melt in the presence of a platinum metal catalyst.

The selection of a carrier salt is a matter of choice depending largely on the nuclear and physical properties required by a particular reactor design. Since the $UF_5$ produced in the salt during reprocessing is the most corrosive component of the salt, the catalytic behavior should be independent of the composition of the carrier salt.

EXAMPLE I 500 mg. of granular platinum black (100 mesh) was added to a 200 g. charge of the fuel carrier salt along with 3.86% by weight uranium as $UF_4$. The above procedure was followed using a hydrogen flow rate in the $U(V)$ reduction step of 40 standard c.c.'s per minute for 30 minutes at 550° C. The $U(V)$ concentration was reduced to less than 0.05%, substantially 100% reduction. The hydrogen utilization rate was greater than 90%.

EXAMPLE II 500 mg. of platinum sponge (45–65 mesh) was added to a 200 g. charge of fuel carrier salt along with 5.66% by weight uranium as $UF_4$, and treated as in Example I. After 15 minutes, 0.96% $U(V)$ by weight remained, representing 66.8% reduction. Hydrogen utilization was greater than 90%.

EXAMPLE III 500 mg. of platinum sponge (45–65 mesh) was added to 200 g. charge of fuel carrier salt along with 5.40% by weight uranium as $UF_4$ and treated as in Example I. After 30 minutes, 0.14% $U(V)$ by weight remained, representing 96.6% reduction. Hydrogen utilization was greater than 90%.

EXAMPLE IV 500 mg. of platinum sponge (45–65 mesh) was added to a 200 g. charge of fuel carrier salt along with 5.24% by weight uranium as $UF_4$ and treated as in Example I. After 1 hour, less than 0.05% $U(V)$ by weight remained, representing substantially 100% reduction. Hydrogen utilization was again greater than 90%.

In the course of investigating the effect of various platinum catalysts, it was discovered that the small amount of platinum which had become alloyed with the surface of the gold reactor was very effective in catalyzing the reaction. An experimental run conducted as in Example I, in that reaction vessel, without the addition of catalyst (aside from that alloyed with the gold reactor) demonstrated substantially 100% reduction in 30 minutes of fuel carrier salt along with 2.4% uranium. This is a particularly advantageous method of catalytically carrying out the reaction since the platinum treated gold reactor may be used repeatedly for conducting the molten salt reconstitution step, thereby eliminating any catalyst handling or catalyst separation problems from the fuel reprocessing system. Alternately, the platinum may be alloyed with other gold equipment contacting the salt. The catalytic behavior exhibited by the gold-platinum alloy surface is especially valuable since the fuel reprocessing process will be carried out behind heavy shielding in close proximity to the reaction core. The catalytic behavior of the platinum-gold alloy surface indicates that a platinum reaction vessel would also catalyze the reaction.

To more fully appreciate the remarkable catalytic behavior of platinum in the molten salt medium, one must consider the extraordinarily large hydrogen utilization rate in view of the mechanics of the system. The $U(V)$ ions, being in the dissolved state, are homogeneously distributed throughout the molten salt. Because of its high density, even a finely divided platinum black catalyst will not be suspended in the salt but will quickly settle to the bottom of the reaction vessel. Yet, when gaseous hydrogen is introduced through a submerged sparge tube, more than 90% of the hydrogen is observed to participate in the reduction of $U(V)$. The demonstrated catalytic behavior is even more surprising when one considers that the reaction proceeds even more swiftly when the only platinum present is alloyed with the gold reaction vessel and has considerably less surface area in contact with the salt than does platinum black or platinum sponge. Since heterogeneous gas reactions catalyzed by solids are thought to take place at the catalyst surface, the discovery that under the above conditions hydrogen can be bubbled through the molten salt above the reactor (and the catalyst) surface and be caused to react with greater than 90% utilization efficiency by a contact catalyst, and even an alloyed catalyst, was most unexpected.

DESCRIPTION OF THE PREFERRED EMBODIMENT

Spent molten salt fuel comprising a carrier salt ($LiF$-$BeF_2$-$ThF_4$ 72–16–12 mole %) and 3.0% $UF_4$ and minor amounts of fission products are withdrawn from a reactor of the type more fully described in commonly assigned U.S. Pat. No. 3,743,577 issued July 3, 1973 to Edward S. Bettis et al. for "Single Fluid Molten Salt Nuclear Breeder Reactor." The withdrawn salt is contacted in a fluorinator with fluorine gas at a temperature of 520° C to convert the uranium to volatile $UF_6$. The remainder of the salt is subjected to fission removal processes more fully described in U.S. Pat. No. 3,672,846 issued to McNeese et al., June 27, 1972, for "Method for Reprocessing Spent Molten Salt Reactor Fuels." The mixed $UF_6$ and $F_2$ exiting the fluorinator is passed through a molten salt stream containing excess $UF_4$ at 550°–600° C where, by reactions (1) and (2) herein, the $UF_6$ and $F_2$ oxidize the $UF_4$ to $UF_5$. The resulting salt stream now containing U(V) is conducted to a reduction zone consisting of gold or gold plated equipment and a platinized gold (gold alloyed with a catalytic amount of platinum) reaction vessel. The platinized vessel may be easily prepared by sprinkling a small amount of platinum black (about 100 mesh) into the reaction vessel and heating the vessel in air to 700° C until an effective catalytic amount of platinum alloys with the gold surface. After cooling, excess platinum is removed and the vessel is ready for use. With the benefit of the present disclosure it is within the skill of the art to determine the amount of platinum required to alloy with the gold to effectively catalyze the reaction for a particular fuel reprocessing system. Once in the reduction zone, the salt stream is sparged with hydrogen by passing a stream of $H_2$ gas at 550°–600° C through the salt. the U(V) is completely reduced to U(IV) and the salt stream is returned to the primary fuel circuit.

What is claimed is:

1. A method of reducing $UF_5$ to $UF_4$ in a molten fluoride salt comprising reacting said salt with hydrogen in the presence of an effective catalytic amount of platinum.
2. The method of claim 1 wherein said platinum is alloyed with gold.
3. The method of claim 1 wherein said reaction is conducted in contact with equipment comprising gold alloyed with platinum.
4. The method of claim 1 wherein said reaction is conducted in contact with platinum equipment.